United States Patent
Sato

(10) Patent No.: US 7,178,405 B2
(45) Date of Patent: Feb. 20, 2007

(54) PRESSURE SENSOR CAPABLE OF CHANGING RESOLUTION IN ACCORDANCE WITH AMOUNT OF PRESSING FORCE

(75) Inventor: Isao Sato, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/157,283

(22) Filed: Jun. 21, 2005

(65) Prior Publication Data

US 2005/0284234 A1    Dec. 29, 2005

(30) Foreign Application Priority Data

Jun. 23, 2004    (JP)    ............... 2004-184512

(51) Int. Cl.
*G01N 3/08*    (2006.01)

(52) U.S. Cl. .................................................. 73/818

(58) Field of Classification Search ............... 73/818
See application file for complete search history.

(56) References Cited

U.S. PATENT DOCUMENTS

| | | | | | |
|---|---|---|---|---|---|
| 4,394,773 | A | * | 7/1983 | Ruell ........................... | 382/124 |
| 4,577,345 | A | * | 3/1986 | Abramov ..................... | 382/124 |
| 4,852,443 | A | * | 8/1989 | Duncan et al. ................ | 84/733 |
| 5,283,558 | A | * | 2/1994 | Chan ........................... | 345/168 |
| 5,708,497 | A | * | 1/1998 | Fujieda ........................ | 356/71 |
| 6,049,620 | A | * | 4/2000 | Dickinson et al. ........... | 382/124 |
| 6,438,257 | B1 | * | 8/2002 | Morimura et al. ........... | 382/124 |
| 6,578,436 | B1 | * | 6/2003 | Ganapathi et al. ........ | 73/862.046 |
| 6,829,950 | B2 | * | 12/2004 | Ganapathi et al. ........ | 73/862.046 |
| 6,862,942 | B2 | * | 3/2005 | Kawahata .................. | 73/862.046 |

FOREIGN PATENT DOCUMENTS

| JP | 10-133818 | 5/1998 |
|---|---|---|
| JP | 2001-142615 | 5/2001 |

* cited by examiner

*Primary Examiner*—Michael Cygan
*Assistant Examiner*—Octavia Davis
(74) *Attorney, Agent, or Firm*—Brinks Hofer Gilson & Lione

(57) ABSTRACT

A pressure sensor includes a surface sheet whose front side is an operating surface and a substrate sheet that includes a plurality of switches and that is disposed below the back side of the surface sheet at a predetermined space therebetween. When the operating surface is depressed, the surface sheet is deformed toward the substrate sheet and a switch of the plurality of switches is turned into an input state, and a resolution of a switch signal from each of the switches varies in accordance with the amount of a pressing force applied on the operating surface. Therefore, an electronic device, such as a cellular phone, installed with the pressure sensor can have various functions realized by a variation in the resolution.

18 Claims, 8 Drawing Sheets

FIG. 3
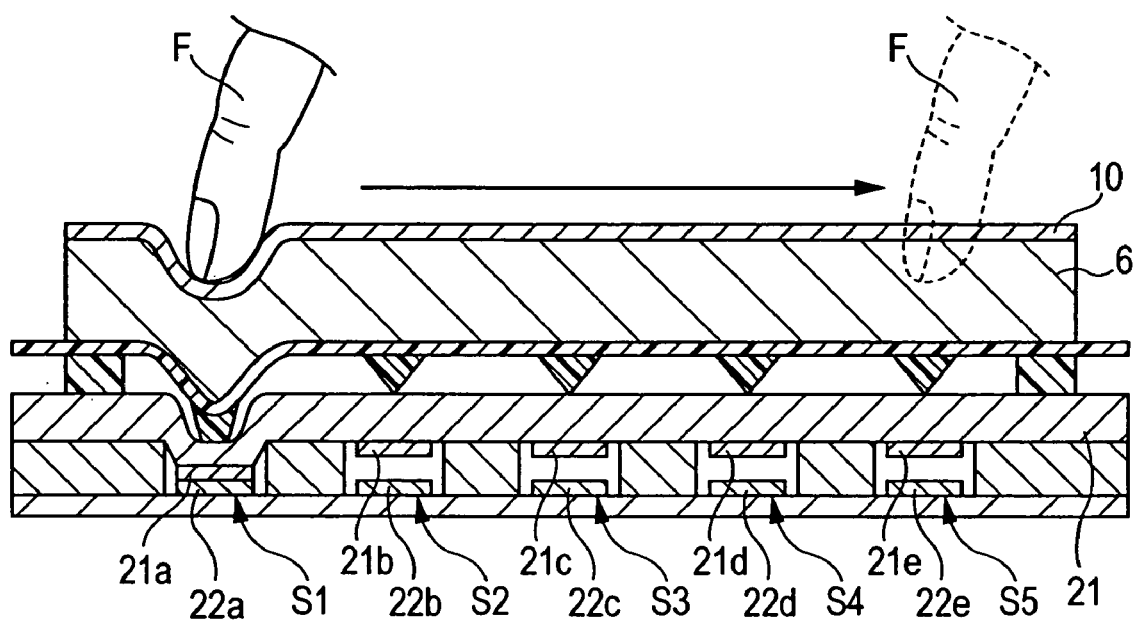
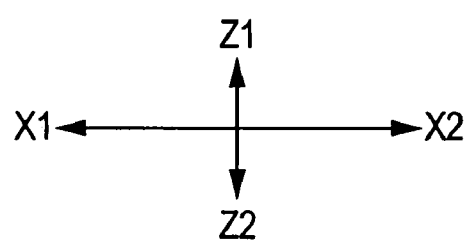

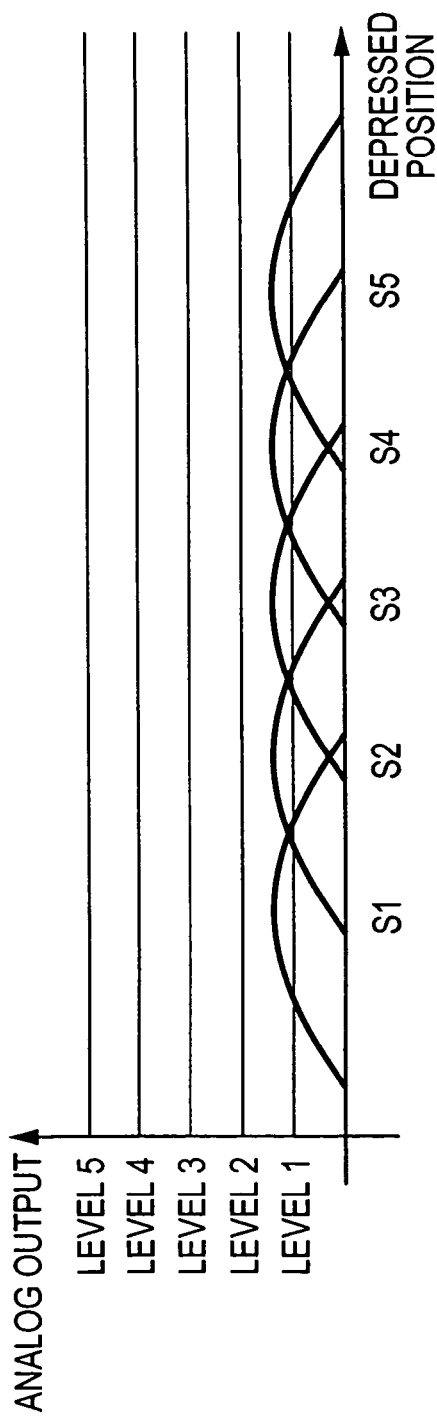
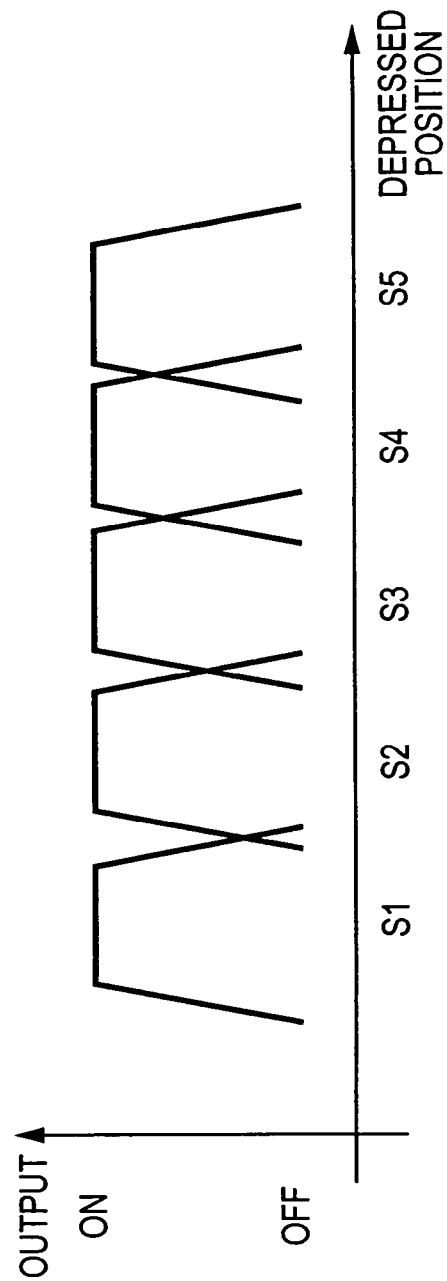

PRESSURE SENSOR CAPABLE OF CHANGING RESOLUTION IN ACCORDANCE WITH AMOUNT OF PRESSING FORCE

This application claims the benefit of priority to Japanese Patent Application No. 2004-184512, filed on Jun. 23, 2004, herein incorporated by reference.

BACKGROUND OF THE INVENTION

1. Field of the Invention

The present invention relates to pressure sensors installed in small electronic devices, such as cellular phones. In particular, the present invention relates to a pressure sensor capable of changing a resolution of a switch signal from a switch in accordance with the amount of a pressing force applied on an operating surface.

2. Description of the Related Art

Japanese Unexamined Patent Application Publication No. 2001-142615 discloses a remote control transmitter, which is exemplarily shown in FIG. 1 of this patent document. This patent document describes, in particular, processing when a plurality of buttons is depressed. One such processing is that the center button is regarded as being depressed when a plurality of buttons is depressed and the number of depressed buttons is an odd number.

As shown in FIG. 11, in a device having five buttons A to E in all, when the button A to the button E is depressed in succession, a switch signal (digital signal) is output from each depressed button, and the depressed button is switched on.

Conventionally, however, it is determined merely whether each button is in the on state or off state from a switch signal from each button, as shown in FIG. 11. Therefore, even if the amount of a pressing force applied on the button is changed, an output waveform is the same as shown in FIG. 11. In other words, since an ON signal is simply output, a pressure sensor disclosed in Japanese Unexamined Patent Application Publication No. 2001-142615 cannot realize various functions.

SUMMARY OF THE INVENTION

The present invention is directed to address the problem described above. It is an object of the present invention to provide a pressure sensor capable of changing a resolution of a switch signal from a switch in accordance with the amount of a pressing force applied on an operating surface.

According to an aspect of the present invention, a pressure sensor includes a surface sheet whose front side is an operating surface and a substrate sheet that includes a plurality of switches and that is disposed below the back side of the surface sheet at a predetermined space therebetween. When the operating surface is depressed, the surface sheet is deformed toward the substrate sheet and a switch of the plurality of switches is turned into an input state, and a resolution of a switch signal from each of the switches varies in accordance with the amount of a pressing force applied on the operating surface.

The pressure sensor according to the present invention turns the switch to the input state in accordance with the switch signal from the depressed switch and changes the resolution of the switch signal in accordance with the amount of the pressing force. Therefore, an electronic device, such as a cellular phone, installed with the pressure sensor according to the present invention can have various functions realized by a variation in the resolution.

In the pressure sensor, preferably, the substrate sheet includes an upper sheet including upper electrodes disposed on the back side of thereof and a lower sheet including lower electrodes disposed on the front side thereof, the lower sheet being separated from the upper sheet and opposing the upper sheet with a predetermined space therebetween. Preferably, each switch is composed of a pair of each of the upper electrodes and each of the lower electrodes, the upper electrode being paired with the lower electrode vertically, and either the upper electrode or the lower electrode is made of a resistive film having a resistance higher than a resistance of the other electrode. Preferably, the resistive film is a carbon resistive film.

As described above, either the upper electrode or the lower electrode is formed from a resistive film with a resistance higher than that of the other electrode. As a result, a resistance between the upper electrode and the lower electrode can be largely varied by the variation in the pressing force, thus increasing the resolution of the switch signal. Therefore, a high-resolution pressure sensor can be realized.

Preferably, the pressure sensor further includes a resolution computing unit configured to compute the resolution. The resolution computing unit includes an analog output detecting unit configured to detect the switch signal from each of the switches as an analog signal and an analog-to-digital converting unit configured to convert the analog signal to a digital signal, and the resolution is computed in accordance with an output level of the analog signal.

Preferably, in the pressure sensor, a movement of the switch signal is detected and the pressure sensor then shifts to a predetermined mode by depressing the operating surface with an operating object and by moving the operating object in a direction in which the plurality of switches is arranged, and processing in the predetermined mode is performed according to a variation in the resolution of the switch signal in accordance with on the pressing force.

The predetermined mode is, for example, a scroll mode, and a processing signal to change a density of a sent image in accordance with the variation in the resolution of the switch signal can be sent to an image processing unit.

The pressure sensor according to the present invention turns the switch to the input state in accordance with the switch signal from the depressed switch and changes the resolution of the switch signal in accordance with the amount of the pressing force. Therefore, an electronic device, such as a cellular phone, installed with the pressure sensor according to the present invention can have various functions realized by a variation in the resolution.

BRIEF DESCRIPTION OF THE DRAWINGS

FIG. 3 is a partial cross section of the pressure sensor for explaining a second state in which the sensor is used;

FIG. 4A shows an output waveform of an analog signal in the first state shown in FIG. 2;

FIG. 4B shows an output waveform of a digital signal to which the analog signal is converted;

DESCRIPTION OF THE PREFERRED EMBODIMENTS

Figure 1:
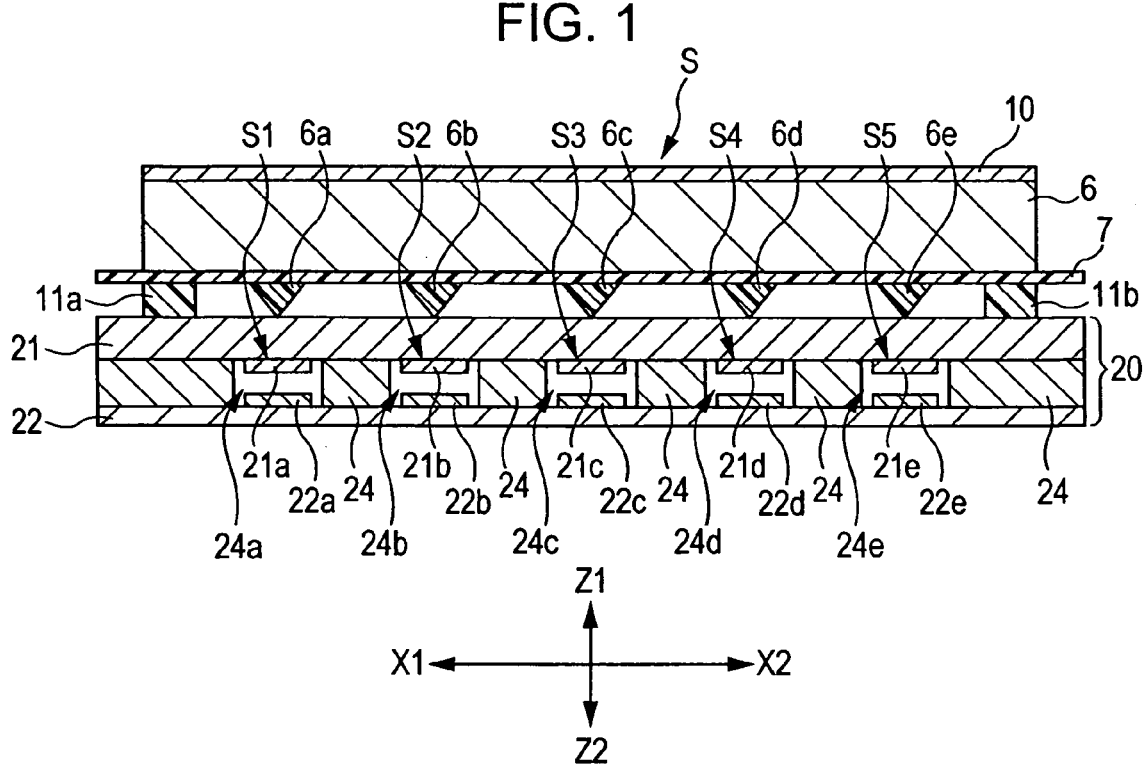
FIG. 1 is a partial cross section of a pressure sensor according to an embodiment of the present invention.

As shown in FIG. 1, a pressure sensor S includes a strip elastic member 6 extending in the X1–X2 direction. A substrate sheet 20 is disposed below the back side of the elastic member 6.

The pressure sensor S can be installed in a small electronic device, such as a cellular phone, a remote controller of an audio system or of an air conditioner, a personal digital assistance (PDA), and the like. The pressure sensor S can be also installed in a relatively larger electronic device, such as a personal computer.

The pressure sensor S is disposed so that an operating surface 10 formed on the front side of the elastic member 6 is exposed from a casing of an electronic device.

The elastic member 6 is made of a soft material that is elastically deformable. The operating surface 10 is made of a material with low friction resistance and is superimposed on the front side of the elastic member 6.

The elastic member 6 is preferably made of silicone rubber. For example, a high-density polyethylene material or a polypropylene material has too high hardness to be deformed by a light load. On the contrary, a low-density polyethylene material exhibits poor characteristics at high temperatures, so that it is unfit for use. In contrast to this, if silicone rubber is used as the elastic member 6, the elastic member 6 is capable of being deformed locally by a light load. The material of the elastic member 6 is not limited to silicone rubber, however. The elastic member 6 may be another rubber elastic member.

However, silicone rubber is disadvantageous in that it is so soft that it is twisted or its frictional resistance is so high that the usability is degraded. Therefore, in the present invention, a film reinforcing member 7 is fixed on the back side of the elastic member 6. The reinforcing member 7 can be made of a polyethylene terephthalate (PET) resin or a polypropylene resin. The reinforcing member 7 is attached to the back side of the elastic member 6, thus preventing twists without impairing deformation of the elastic member 6 in the Z1–Z2 direction.

One measure for addressing a problem of degraded usability due to high frictional resistance is that a silicone resin containing an inorganic filler, e.g., silica particles is formed on the operating surface 10. Such a silicone resin is applied or printed on the operating surface 10, so that the frictional resistance is reduced and a finger or the like can be smoothly moved on the operating surface 10. The material applied or printed on the operating surface 10 is not limited to the silicone resin containing silica particles described above, i.e., another material is applicable, as long as the operating surface 10 can be formed so as to be a low-frictional resistance smooth face.

Since the operating surface 10 with low friction resistance is disposed on the elastic member 6, a finger or the like can be smoothly moved in the X1–X2 direction. As a result, the usability can be improved.

As shown in FIG. 1, the reinforcing member 7 is superimposed on a face adjacent to the Z2 direction (the back side) of the elastic member 6. The reinforcing member 7 is formed so as to be a film.

Figure 2:
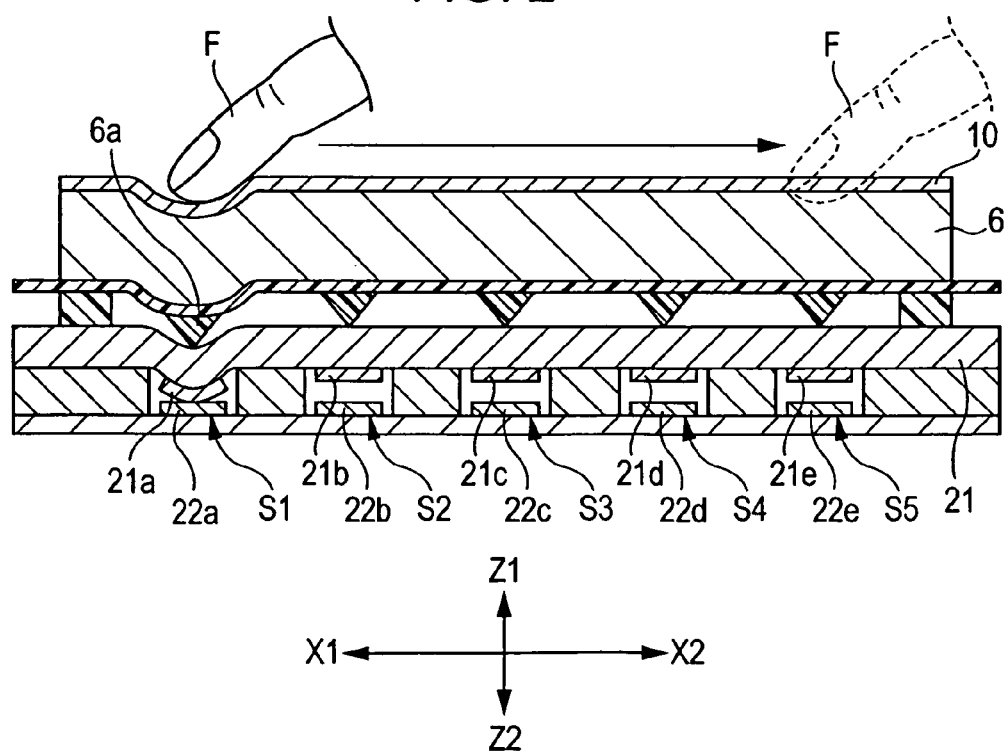
FIG. 2 is a partial cross section of the pressure sensor for explaining a first state in which the sensor is used.

As shown in FIGS. 1 to 3, on a face adjacent to the Z2 direction of the reinforcing member 7, for example, five projections 6a, 6b, 6c, 6d, and 6e, each having a triangle in cross section, are linearly disposed along the X1–X2 direction at equal intervals. Each of the projections may have a form other than that shown in FIG. 1. For example, the projection may have a semicircular form in cross section. Preferably, the projection has a sharp-pointed tip and is made of a material that is elastically deformable, since a contact area where the projection comes into contact with the substrate sheet 20 is prone to be largely changed in accordance with a variation in a pressing force applied on the operating surface 10 and an output value can be largely changed in accordance with a variation in the contact area.

In the embodiment of the present invention, the elastic member 6, the operating surface 10, the reinforcing member 7, and the projections 6a to 6e constitute a surface sheet.

As shown in FIG. 1, supporting portions 11a and 11b are disposed outside the projections 6a and 6e, respectively. The projections 6a to 6e and the supporting portions 11a and 11b are made of an ultraviolet-curing resin and are simultaneously formed by printing, for example.

The substrate sheet 20 is described below. The substrate sheet 20 includes an upper sheet 21 with upper electrodes 21a to 21e disposed on the back side and a lower sheet 22 with lower electrodes 22a to 22e disposed on the front side.

As shown in FIG. 1, the upper sheet 21 and the lower sheet 22 are disposed so that the upper electrodes 21a to 21e are opposed to the lower electrodes 22a to 22e. Spacers 24 are disposed between the upper sheet 21 and the lower sheet 22 so that gaps 24a to 24e are positioned where the electrodes are opposed to each other.

The upper electrodes 21a to 21e of the upper sheet 21 and the lower electrodes 22a to 22e of the lower sheet 22 constitute switches S1 to S5, respectively.

Figure 8:
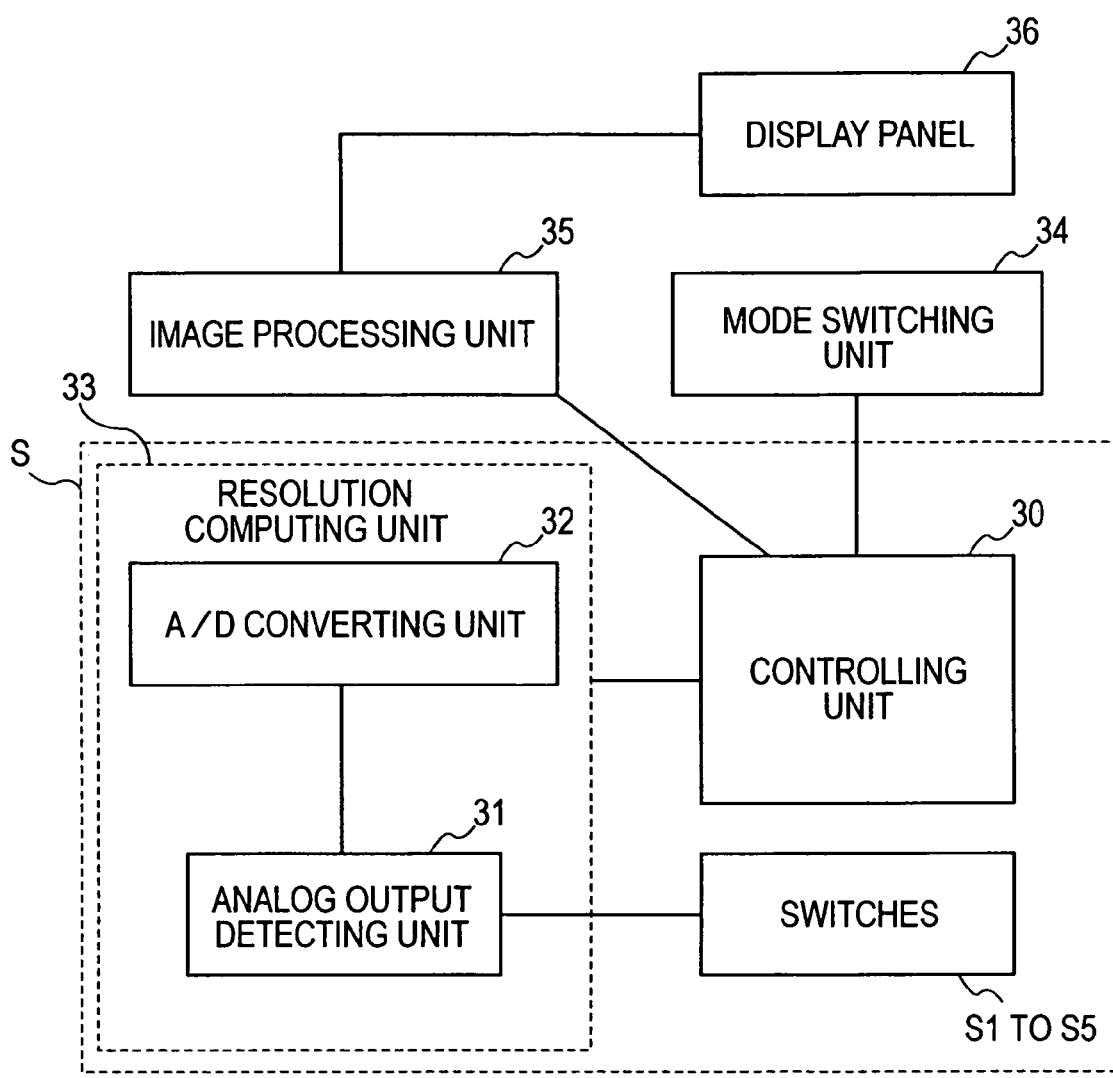
FIG. 8 is a block diagram of the pressure sensor according to the embodiment of the present invention.

The block diagram shown in FIG. 8 is described below. As shown in FIG. 8, the pressure sensor S according to the embodiment of the present invention includes the switches S1 to S5, a controlling unit (central processing unit, or CPU) 30, a resolution computing unit 33. The resolution computing unit 33 includes an analog output detecting unit 31 and an analog-to-digital (A/D) converting unit 32.

The analog output detecting unit 31 functions to detect a switch signal from each of the switches S1 to S5 as an analog signal. The A/D converting unit 32 functions to convert the analog signal to a digital signal.

The controlling unit 30 is connected to the resolution computing unit 33, a mode switching unit 34, an image processing unit 35, and the like to provide each unit with various instruction signals.

For example, the controlling unit 30 outputs an instruction signal to activate a predetermined mode to the mode switching unit 34 in accordance with a digital signal obtained from the A/D converting unit 32. Upon receipt of the instruction signal, the mode switching unit 34 activates the predetermined mode. The image processing unit 35 performs image processing in accordance with an instruction signal from the controlling unit 30, and an image subjected to the image processing is displayed on a display panel 36.

Figure 6:
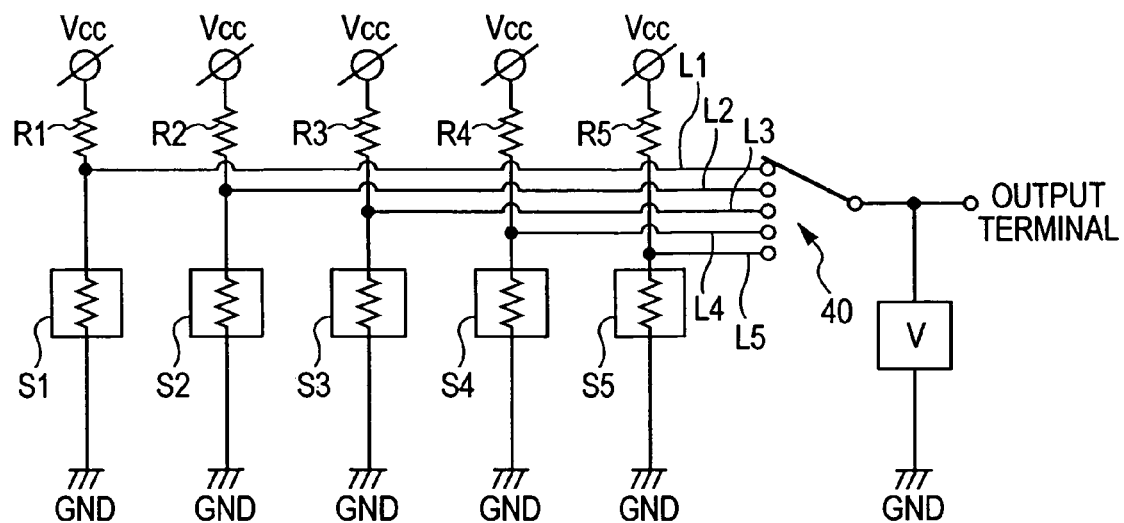
FIG. 6 shows an example of a circuit of the pressure sensor according to the embodiment of the present invention.

As shown in FIG. 6, the switches S1 to S5 are connected to input terminals (Vcc) via resistors R1 to R5, respectively. Output lines L1 to L5 are connected to the paths between the input terminals (Vcc) and the switches S1 to S5. The output lines L1 to L5 are capable of being connected to an output terminal via a switch switching unit 40.

Figure 7:
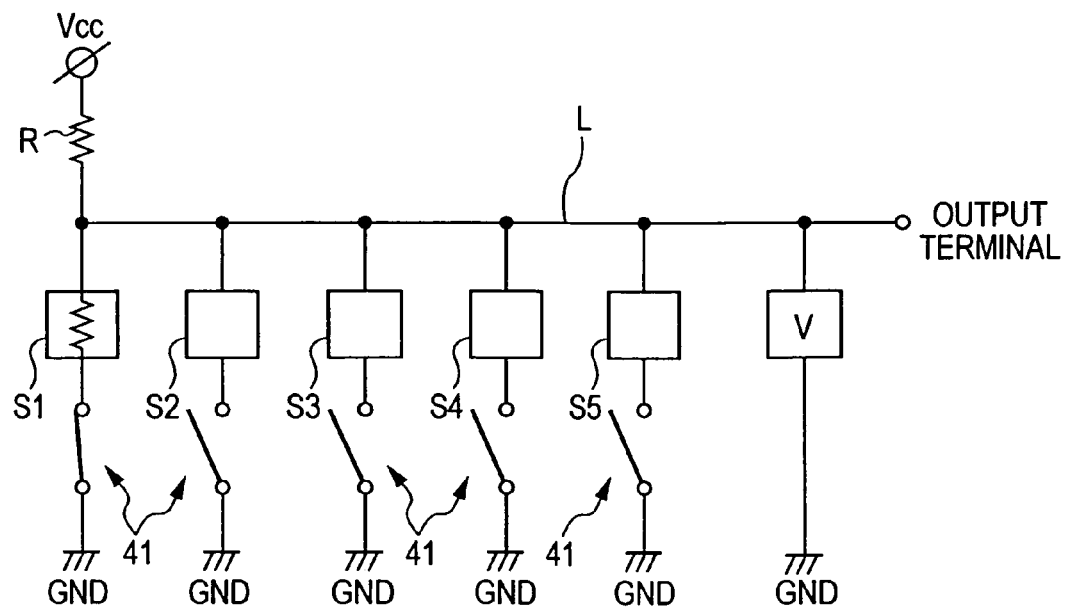
FIG. 7 shows another example of a circuit of the pressure sensor according to the embodiment of the present invention.

Alternatively, as shown in FIG. 7, a single output line L may be connected to the switches S1 to S5 in parallel. In this case, switch switching units 41 are disposed between the switches S1 to S5 and grounds GNDs, as shown in FIG. 7.

In the embodiment of present invention, either the upper electrodes 21a to 21e or the lower electrodes 22a to 22e are made of a resistive film having a resistance higher than that of the other opposing electrodes. The resistive film is preferably a carbon resistive film. In the embodiment shown in FIG. 1, the lower electrodes 22a to 22e are formed from the carbon resistive film.

As shown in FIG. 2, an area of the operating surface 10 directly above the switch S1 is depressed by an operating object F, such as a finger, or the like, so that the elastic member 6 is deformed downwardly (in the Z2 direction). Then, the projection 6a disposed on the back side of the reinforcing member 7 depresses the upper sheet 21 downwardly, so that the upper sheet 21 is deformed downwardly. When the upper electrode 21a disposed on the back side of the upper sheet 21 then comes into contact with the lower electrode 22a made of the carbon resistive film, a switch signal is output from the switch S1.

FIGS. 6 and 7 show states in which the switch S1 is connected to the output terminal. The switch switching units 40 and 41 always perform sensing and detect a connected switch. In FIG. 6, the output line L1 connected to the switch S1 is connected to the output terminal, so that an output from the switch S1 is obtained from the output terminal. In FIG. 7, the switch S1 is connected to the ground GND, so that an output from the switch S1 is obtained from the output terminal through the output line L.

As described above, the lower electrode 22a is made of the carbon resistive film. Therefore, when the sensor S shifts the first state shown in FIG. 2 to the second state shown in FIG. 3, in which the operating object F strongly depresses the operating surface 10 downwardly (in the Z2 direction), a contact area where the upper electrode 21a is in contact with the lower electrode 22a is increased. This changes a resistance largely, and as a result, an output value varies largely.

Figure 5A:
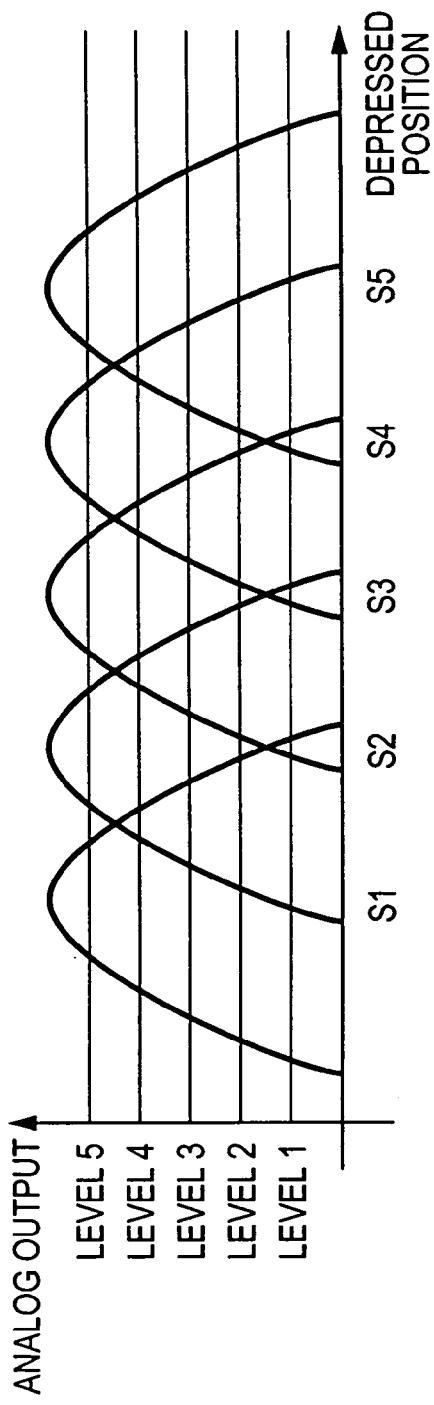
FIG. 5A shows an output waveform of an analog signal in the second state shown in FIG. 3.

In the embodiment of present invention, as described with reference to FIG. 8, the output value is detected as an analog signal by the analog output detecting unit 31. Therefore, when the operating surface 10 is lightly depressed, as shown in FIG. 2, an output waveform of the analog signal with a small output value is obtained, as shown in FIG. 4A. On the other hand, when the operating surface 10 is strongly depressed, as shown in FIG. 3, an output waveform of the analog signal with a large output value is obtained, as shown in FIG. 5A.

The distinctive features of the present invention are described below with reference to FIGS. 2 to 5. As shown in FIG. 2, when the operating object F lightly depresses an area of the operating surface 10 directly above the switch S1 downwardly (in the Z2 direction) and the output waveform of the analog signal is obtained as shown in FIG. 4A, the A/D converting unit 32 determines whether the output value is greater than or equal to a threshold with a predetermined level using a comparator.

The comparator determines whether the output value shown in FIG. 4A is threshold level I for being greater than or equal to LEVEL 1 and being below LEVEL 2, threshold level II for being equal to LEVEL 2 and being below LEVEL 3, threshold level III for being equal to LEVEL 3 and being below LEVEL 4, threshold level IV for being equal to LEVEL 4 and being below LEVEL 5, or threshold level V for being greater than or equal to LEVEL 5. Then, when the analog signal is converted to a digital signal, an output ON signal is output every time the output value exceeds each threshold level.

In FIG. 4A, the output value obtained when the switch S1 is depressed is in threshold level I, and the output level reaching threshold levels II to V cannot be obtained. Therefore, in accordance with threshold level I, the A/D converting unit 32 generates one output ON signal when the switch S1 is depressed, as shown in FIG. 4B.

In the present invention, the number of output ON signals for a digital signal obtained when each switch is depressed is called "resolution". Specifically, in FIG. 4B, the resolution of a switch signal obtained when the switch S1 is depressed is one.

When the resolution is greater than or equal to one, the controlling unit 30 turns the switch S1 into an input state, and provides the mode switching unit 34 and the image processing unit 35 with predetermined instruction signals in accordance with the switch signal from the switch S1.

As shown in FIG. 2, the operating object F is slid in the direction in which the five switches S1 to S5 are arranged (in the X2 direction) on the operating surface 10. When a pressing force applied from the operating object F remains invariant, as shown in FIG. 4A, the output values of the analog signals from the switches S1 to S5 have the same level, i.e., all the output values obtained when the switches S1 to S5 are depressed have threshold level I, and therefore, an output more than threshold level I cannot be obtained. As a result, when the analog signals are converted to the digital signals, each resolution obtained when the switches S1 to S5 are depressed is one, as shown in FIG. 4B. Then, a switch signal with a resolution of one is output from the switches S1 to S5 in succession, as the operating object F moves.

Then, as shown in FIG. 3, the operating object F depresses the operating surface 10 downwardly (in the Z2 direction) more strongly than the first state shown in FIG. 2. Assume that the operating object F depresses an area of the operating surface 10 directly above the switch S1.

Figure 5B:
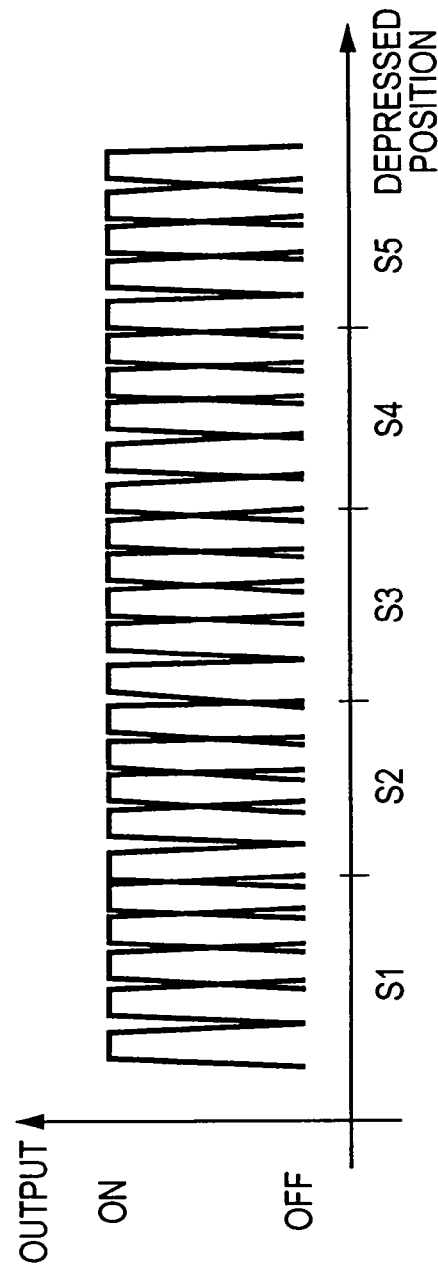
FIG. 5B shows an output waveform of a digital signal to which the analog signal is converted.

In this case, as shown in FIG. 5A, the output levels of the analog signals exceed LEVEL 5. Therefore, the A/D converting unit 32 generates an output ON signal every time each of the output values exceeds every threshold level I to V when converting the analog signals to the digital signals. As a result, as shown in FIG. 5B, the digital signal obtained when the switch S1 is depressed is composed of five output-ON signals, and therefore, the resolution of the switch signal when the switch S1 is depressed is five.

As shown in FIG. 3, the operating object F is slid in the direction in which the five switches S1 to S5 are arranged (in the X2 direction) on the operating surface 10. When a pressing force applied by the operating object F remains invariant, as shown in FIG. 5A, the output values of the analog signals from the switches S1 to S5 have the same level, i.e., all the output values obtained when the switches S1 to S5 are depressed have threshold level V. Therefore, when the analog signals are converted to the digital signals, each of the resolutions of the switch signals obtained when the switches S1 to S5 are depressed has five, as shown in FIG. 5B. Therefore, the switch signal with a resolution of five is output from the switches S1 to S5 in succession, as the operating object F moves.

As described above, in the embodiment of the present invention, a resolution of the switch signal from each of the switches S1 to S5 can be changed in accordance with the amount of the pressing force from the operating object F on the operating surface 10.

Figure 9:
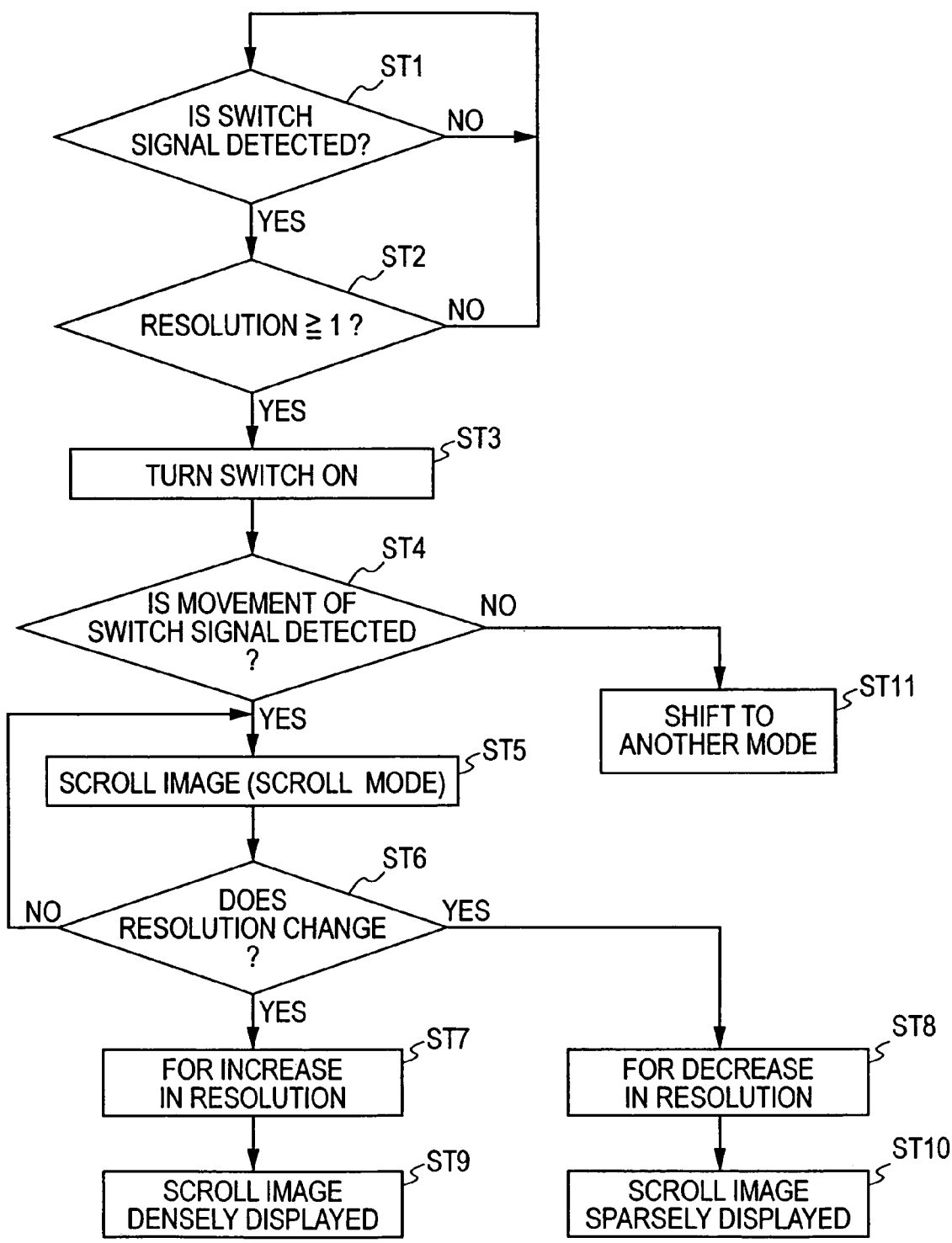
FIG. 9 is a flowchart showing a case in which a scroll mode is activated.

In the embodiment of the present invention, image processing in a scroll mode can be realized as described below using, for example, such a switch-signal resolution changing with the amount of the pressing force. The processing is described mainly with reference to the flowchart of FIG. 9.

In step ST1, it is determined whether a switch signal (analog output signal) output upon depressing any of the switches S1 to S5 is detected. If the switch signal is determined to be detected, the A/D converting unit 32 of the resolution computing unit 33, shown in FIG. 8, converts the analog signal to a digital signal.

In step ST2, it is determined whether a resolution of the converted digital signal is greater than or equal to one. If the resolution is determined to be greater than or equal to one, the depressed switch S1 is turned to the input state (in step ST3).

Figure 10:
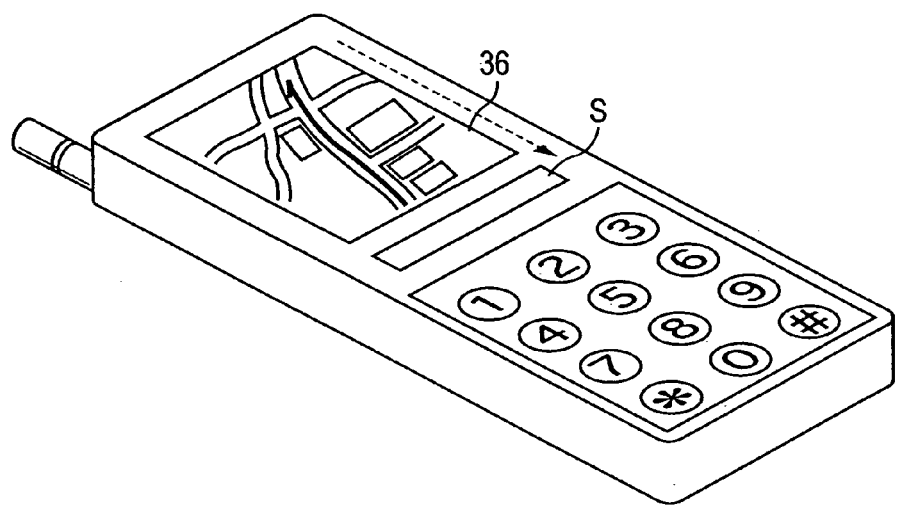
FIG. 10 is a perspective view of a cellular phone installed with the pressure sensor according to the embodiment of the present invention.
Figure 11:
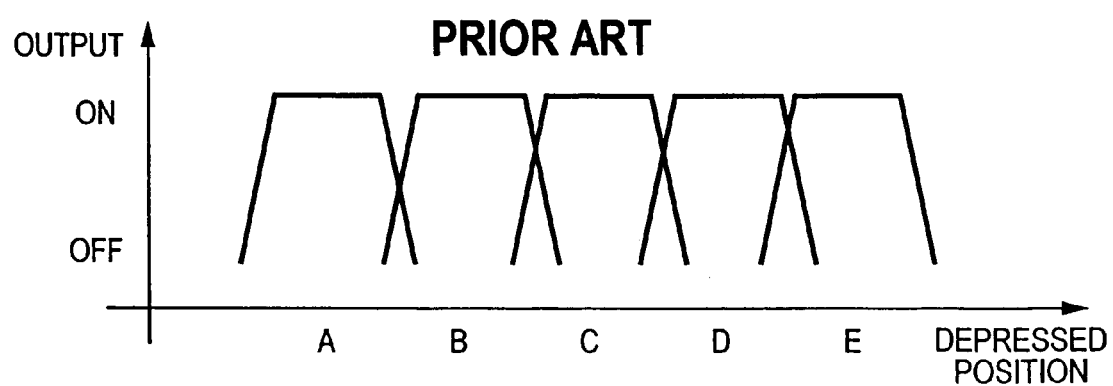
FIG. 11 shows an output waveform of a digital signal of a conventional pressure sensor.

For example, as shown in FIG. 2, when the operating object F is moved from an area directly above the switch S1 to an area directly above the switch S5 on the operating surface 10 and a switch signal with a resolution of one or more is output from the switches S1 to S5 in succession, the movement of the operating object F is detected (step ST4). Then, the controlling unit 30 provides the mode switching unit 34 with an instruction signal to activate a scroll mode. Then, for example, a map displayed on the display panel 36 shown in FIG. 10 is scrolled in the direction of the arrow (dotted lines) (step ST5).

In this scroll mode, if the resolution of the switch signal output from each of the switches S1 to S5 varies (step ST6), the processing moves to step ST7 or step ST8.

For example, in the case where the sensor S shifts from the first state shown in FIG. 2 to the second state shown in FIG. 3, when the resolution of the switch signal output from each of the switches S1 to S5 is directly increased from 1 to 5 (step ST7), the image processing unit 35 raises the resolution of an image of the map displayed on the display panel 36 so that the image is sent so as to be densely displayed. Therefore, the map displayed on the display panel 36 with, for example, newly-displayed streets and buildings is scrolled (step ST9).

Alternatively, in the case where the sensor S shifts from the second state shown in FIG. 3 to the first state shown in FIG. 2, when the resolution of the switch signal output from each of the switches S1 to S5 is directly decreased from 5 to 1 (step ST8), the image processing unit 35 reduces the resolution of an image of the map displayed on the display panel 36 so that the image is sent so as to be sparsely displayed. Therefore, the map displayed on the display panel 36 with, for example, only main roads is scrolled (step ST10).

Although the above embodiment is described with the case when the resolution of the switch signal is one or five, the embodiment is not limited to this. In accordance with the increase in resolution from 1 to 2 to 3 to 4 to 5, a sent image to be densely displayed is controlled so as to gradually change the degree of density. On the other hand, in accordance with the decrease in resolution from 5 to 4 to 3 to 2 to 1, a sent image to be sparsely displayed is controlled so as to gradually change the degree of sparsity.

As described above, the degree of density or sparsity of a sent image can be varied in accordance with the magnitude of resolution of a switch signal.

In step ST4, if a switch signal from only a specific switch is detected (i.e., if the movement of the operating object F is not detected), the processing may shift to another mode (step ST11), in place of shifting to the scroll mode.

For example, if a menu screen with multiple icons arranged is displayed on the display panel 36 shown in FIG. 10, the resolution is directly increased from one, as shown in FIG. 2, to five, as shown in FIG. 3, the controlling unit 30 may output a definite signal to open an icon and the image processing unit 35 may perform image processing of opening the icon.

As described above, the switches S1 to 55 are turned into the input states in accordance with the switch signals of the switches S1 to S5, and the resolution of each of the switch signals is changed in accordance with the amount of the pressing force. As a result, an electronic device, such as a cellular phone, or the like, installed with the pressure sensor S according to the embodiment of the present invention can have various functions realized by a variation in the resolution.

The "various functions realized by a variation in the resolution" is not limited to the variations in the density of a sent image. It may be a speed of sending an image or alternative functions.

The invention claimed is:

1. A pressure sensor comprising:
a surface sheet whose front side is an operating surface; and
a substrate sheet including a plurality of switches and being disposed below the back side of the surface sheet at a predetermined space therebetween,
wherein the substrate sheet includes an upper sheet including upper electrodes disposed on a back side of thereof and a lower sheet including lower electrodes disposed on a front side thereof, the lower sheet being separated from the upper sheet and opposing the upper sheet with a predetermined space therebetween,
wherein each switch comprises an upper electrode vertically opposing a lower electrode such that the upper or lower electrode in at least one switch comprises a resistive film and the resistances of the upper and lower electrodes differ from one another in the at least one switch, and
wherein a resolution of switch signals from at least one switch is configured to vary as the contact area between the opposing electrodes in the at least one switch changes in accordance with an amount of a pressing force applied on the operating surface, so as to change a resistance value of the at least one switch.

2. The pressure sensor according to claim 1, wherein the resistive film is a carbon resistive film.

3. The pressure sensor according to claim 1, further comprising:
resolution computing means for computing the resolution,
wherein the resolution computing means includes analog output detecting means for detecting the switch signal from each of the switches as an analog signal and analog-to-digital converting means for converting the analog signal to a digital signal, and
the resolution is computed in accordance with an output level of the analog signal.

4. The pressure sensor according to claim 1, wherein a movement of the switch signal is detected and the pressure sensor then shifts to a predetermined mode by depressing the operating surface with an operating object and by moving the operating object in a direction in which the plurality of switches is arranged, and
processing in the predetermined mode is performed according to a variation in the resolution of switch signals in accordance with on the pressing force.

5. The pressure sensor according to claim 4, further comprising an image processing unit,
wherein the predetermined mode is a scroll mode, and
a processing signal to change a density of a sent image in accordance with the variation in the resolution of switch signals is sent to an image processing unit.

6. The pressure sensor according to claim 1, wherein the surface sheet further comprises an elastic member disposed between the operator surface and the substrate sheet.

7. The pressure sensor according to claim 1, further comprising a plurality of elastically deformable projections contacting the substrate sheet, wherein the projections are configured to cooperate with opposing pairs of upper and lower electrodes in the plurality of switches to vary the contact area between the opposing pairs of upper and lower electrodes.

8. The pressure sensor according to claim 3, wherein the analog-to-digital converting means comprises a comparator that determines whether an output value of the analog signal is equal to or greater than a predetermined threshold level, wherein a plurality of threshold levels is determined by a plurality of corresponding settings to define the resolution.

9. A pressure sensor comprising:
a surface sheet comprising an operating surface;
a substrate sheet disposed at a predetermined space below the surface sheet, the substrate sheet comprising a plurality of switches;
an elastic member disposed between the operating surface and the substrate sheet;
a reinforcing sheet disposed at the side of the elastic member facing the substrate sheet;
a plurality of elastically deformable projections located between the reinforcing sheet and the substrate sheet and configured to cooperate with the switches to vary the contact area between opposing pairs of upper and lower electrodes in accordance with a pressing force; and
wherein the operating surface is configured to deform toward the substrate sheet to generate an output signal from at least one of said plurality of switches when the pressing force is applied to the operating surface; and
wherein the switches are configured to supply increased numbers of output signals depending on the amount of the pressing force applied to the operating surface.

10. The pressure sensor according to claim 9, wherein the substrate sheet includes an upper sheet and a lower sheet, wherein upper electrodes are disposed on a side of the upper sheet and lower electrodes are disposed on a side of the lower sheet, the upper and lower electrodes being separated by a predetermined space and disposed between the upper and lower sheet;
wherein one or more of the plurality of switches comprise an upper electrode facing a lower electrode, wherein an opposing pair of upper and lower electrodes in the switches are configured to contact one another when a sufficient pressing force is applied to the operating surface, the point of contact between the opposing pair of electrodes defining a contact area therebetween.

11. The pressure sensor according to claim 10, wherein increasing the pressing force to the operating surface is capable of increasing the contact area between the pair of an opposing pair of upper and lower electrodes in a switch or increasing the number of output signals generated from the switch.

12. The pressure sensor according to claim 10, wherein opposing pairs of the upper and lower electrodes are separated by air.

13. The pressure sensor according to claim 10, wherein at least one of the paired electrodes in each switch comprises a resistive film and the resistances of the upper and lower electrodes differ from one another in each switch.

14. The pressure sensor according to claim 13, wherein the resistive film is a carbon resistive film.

15. The pressure sensor according to claim 9, further comprising:
a resolution computing means for computing a resolution for a switch signal from at least one of the plurality of switches,
wherein the resolution depends on a magnitude of the pressing force applied to the operating surface,
wherein the resolution computing means comprises an analog output detecting means for detecting a switch signal from a switch as an analog signal and an analog-to-digital converting means for converting the analog signal to a digital signal, and
wherein the resolution is computed in accordance with an output level of the analog signal.

16. The pressure sensor according to claim 15, wherein the analog-to-digital converting means comprises a comparator configured to determine whether an output value of the analog signal is equal to or greater than a predetermined threshold level.

17. The pressure sensor according to claim 9, wherein the pressure sensor is configured to activate a predetermined mode when detecting movement of an operating object and depression of the operating surface in a direction in which the plurality of switches are arranged, wherein the predetermined mode is configured to process switch signal variation according to the amount of pressing force applied to the operating surface.

18. The pressure sensor according to claim 17, further comprising an image processing unit configured to receive processing signals from the pressure sensor to change a density of an image sent to the image processing unit according to switch signal variation.

* * * * *

UNITED STATES PATENT AND TRADEMARK OFFICE
CERTIFICATE OF CORRECTION

| | | |
|---|---|---|
| PATENT NO. | : 7,178,405 B2 | |
| APPLICATION NO. | : 11/157283 | |
| DATED | : February 20, 2007 | |
| INVENTOR(S) | : Isao Sato | |

It is certified that error appears in the above-identified patent and that said Letters Patent is hereby corrected as shown below:

Column 8, in claim 1, line 38, after "disposed on a back side" delete "of".

Signed and Sealed this

Twenty-fourth Day of April, 2007

JON W. DUDAS
*Director of the United States Patent and Trademark Office*